United States Patent [19]

Kataoka

[11] Patent Number: 5,001,404

[45] Date of Patent: Mar. 19, 1991

[54] VIBRATION WAVE MOTOR

[75] Inventor: Kenichi Kataoka, Yokohama, Japan

[73] Assignee: Canon Kabushiki Kaisha, Tokyo, Japan

[21] Appl. No.: 441,227

[22] Filed: Nov. 27, 1989

Related U.S. Application Data

[63] Continuation of Ser. No. 213,120, Jun. 29, 1988, abandoned.

[30] Foreign Application Priority Data

Jul. 3, 1987 [JP] Japan .............................. 62-166662

[51] Int. Cl.[5] ............................................ H01L 41/08
[52] U.S. Cl. .................................. 318/116; 310/316; 310/323
[58] Field of Search ............... 310/316, 317, 323, 328, 310/366; 318/116, 118

[56] References Cited

U.S. PATENT DOCUMENTS

| | | | |
|---|---|---|---|
| 4,510,411 | 4/1985 | Makamata et al. | 310/328 X |
| 4,692,649 | 9/1987 | Izukawa et al. | 310/323 X |
| 4,727,276 | 2/1988 | Izukawa et al. | 31/276 X |
| 4,743,788 | 5/1988 | Takagi et al. | 310/328 X |
| 4,749,896 | 6/1988 | Suzuki et al. | 310/323 X |

*Primary Examiner*—Mark O. Budd
*Attorney, Agent, or Firm*—Fitzpatrick Cella Harper & Scinto

[57] ABSTRACT

At least two vibration detection electro-mechanical energy conversion element areas substantially centered on the antinodes of both the standing waves are arranged between the group of driving electro-mechanical energy conversion element areas. Amplitudes of two standing waves generated upon application of AC voltages to these groups and a time-phase difference between the standing waves can be accurately detected. The amplitudes of the standing waves can be made equal to each other, and the time-phase difference can be set to be $\pi/2$, thereby obtaining an ideal vibration state of a travelling vibration wave generated in a vibration plate.

9 Claims, 8 Drawing Sheets

| INPUT VOLTAGE | | OUTPUT VOLTAGE |
|---|---|---|
| $-\frac{V}{2}$ (FALSE) | $-\frac{V}{2}$ (FALSE) | $+\frac{V}{2}$ (TRUE) |
| $-\frac{V}{2}$ (FALSE) | $+\frac{V}{2}$ (TRUE) | $-\frac{V}{2}$ (FALSE) |
| $+\frac{V}{2}$ (TRUE) | $-\frac{V}{2}$ (FALSE) | $-\frac{V}{2}$ (FALSE) |
| $+\frac{V}{2}$ (TRUE) | $+\frac{V}{2}$ (TRUE) | $+\frac{V}{2}$ (TRUE) |

VIBRATION WAVE MOTOR

This application is a continuation of application Ser. No. 07/213,120 filed June 29, 1988, now abandoned.

BACKGROUND OF THE INVENTION:

1. Field of the Invention

This invention relates to a vibration wave motor which is frictionally driven by a travelling vibration wave generated in an elastic vibration member.

2. Related Background Art

Vibration wave motors for frictionally driving a moving member by utilizing a travelling vibration wave are proposed in, e.g., U.S. Pat. Nos. 4,580,073 and 4,484,099. These motors have been commercially available in recent years. The principle of operation of the vibration wave motor will be described below.

Two groups each consisting of a plurality of piezoelectric elements are fixed on one surface of a ring-like elastic vibration plate having a circumferential length which is an integer multiple of a given length $\lambda$ to constitute a stator. These piezoelectric elements are normally arranged at $\lambda/2$ pitches in each group and alternately have opposite polarities. The piezoelectric elements in the groups are offset by an odd number multiple of $\lambda/4$. Electrode films are formed on the piezoelectric elements of the groups, respectively. When an AC voltage is applied to any one of the groups, a standing wave (wavelength: $\lambda$) of flexural vibrations is generated throughout the entire circumference of the vibration plate such that antinode positions are located at the central positions of the piezoelectric elements of the group and positions away from the central positions every $\lambda/2$ intervals, and nodes are located at the central positions between the antinodes. When an AC voltage is applied to the remaining group, a similar standing wave is generated. However, in this case, the positions of the antinodes and the nodes are offset from the first standing wave by $\lambda/4$. When AC voltages having a positional difference of $\pi/2$ as a function of time and having the same frequencies are simultaneously applied to both the groups, two standing waves are combined to generate a travelling wave (wavelength:$\lambda$) of flexural vibrations in the circumferential direction of the vibration plate. In this case, the respective points on the other surface of the vibration plate having a predetermined thickness are subjected to a kind of elliptical motion. If a ring-like moving member serving as a rotor is brought into tight contact with the other surface of the vibration plate, the moving member receives a circumferential frictional force from the vibration plate and is rotated. The direction of rotation can be reversed by changing a positive phase difference between the AC voltages applied to both the groups into a negative difference, and vice versa. The above description is concerned with the principle of operation of a vibration wave motor of this type.

A driver circuit in a conventional vibration wave motor of this type is proposed in, e.g., Japanese Pat. Laid-Open (Kokai) No. 61-157276, U.S. Pat. No. 4,501,411, and Japanese Pat. Laid-Open (Kokai) No. 59-156169. One vibration detection piezoelectric element is fixed on the other one of the groups of piezoelectric elements (these elements are referred to as driving piezoelectric elements), and a frequency of the AC voltage applied to the driving piezoelectric elements is automatically changed into a resonance frequency in accordance with a detection output from the detection piezoelectric element, thereby improving efficiency of the vibration wave motor.

In the vibration wave motor described above, however, the vibration detection piezoelectric element is fixed at the same spatial phase position as that of one of the groups of driving piezoelectric elements. More specifically, since the central point of the vibration detection piezoelectric element is located at a position offset from the central point of one area of the group of driving piezoelectric elements by a integer multiple of $\lambda/2$, thus posing the following problems.

First, since the frequency characteristics of standing waves generated upon application of an AC voltage to the groups differ from each other due to the vibration detection piezoelectric element located at the same spatial phase position as that of one of the groups of driving piezoelectric elements, the vibration detection piezoelectric element can detect only a vibration state of the standing wave generated by applying the AC voltage to one group of driving piezoelectric elements.

Second, a time-phase difference between both the standing waves generated upon application of the AC voltages to both the groups and an amplitude of one of the standing waves must be controlled by an open loop due to the first reason. The time-phases of the standing waves are greatly shifted from $\pi/2$, and a difference between the amplitudes of the standing waves is increased. As a result, the amplitude of the travelling wave greatly varies, thus causing degradation of efficiency and unstable rotation of the motor.

SUMMARY OF THE INVENTION

It is an object of the present invention to solve the conventional problems described above.

It is another object of the present invention to provide a vibration wave motor or an actuator wherein a vibration state of a travelling vibration wave generated by a vibration plate becomes ideal, and driving efficiency and rotational stability of the motor can be improved.

In order to achieve the above objects of the present invention, there is provided a vibration wave motor for frictionally driving with a travelling vibration wave a moving member brought into tight contact with the vibration plate, wherein at least two vibration detection electro-mechanical energy conversion element areas substantially centered on the antinodes of both the standing waves are arranged between the groups of driving electro-mechanical energy conversion element areas in said vibration plate.

BRIEF DESCRIPTION OF THE DRAWINGS

FIGS. 10(a) to 10(m) are timing charts for explaining the operation of the first embodiment shown in FIG. 2.

DETAILED DESCRIPTION OF THE PREFERRED EMBODIMENTS

Figure 1A:
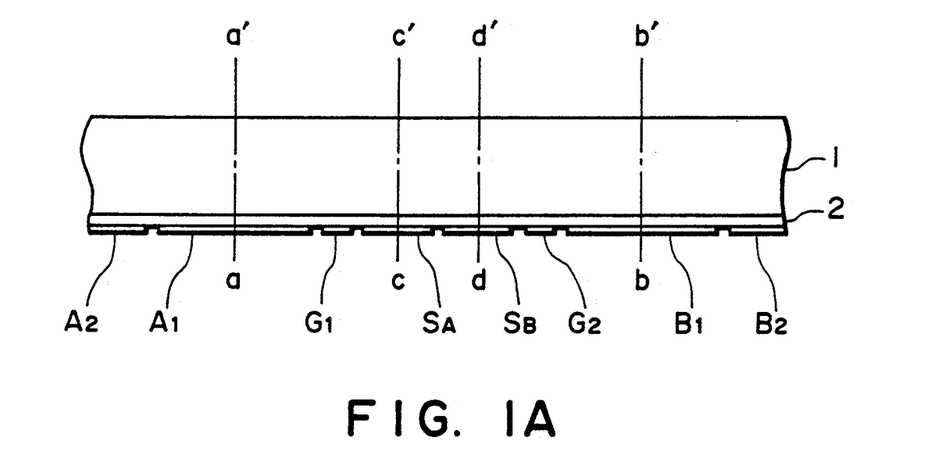
FIG. 1A is a side view showing part of a stator of a vibration wave motor according to the first embodiment of the present invention.
Figure 1B:
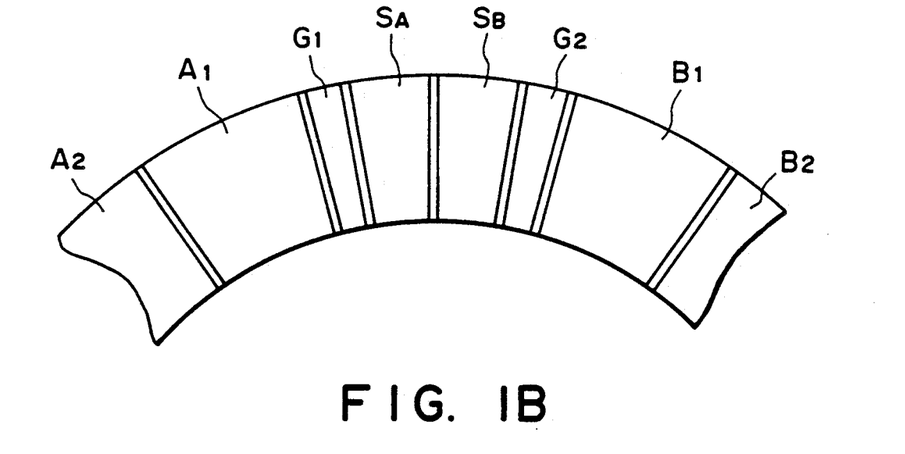
FIG. 1B is a plan view of the stator in FIG. 1A.

FIG. 1 shows part of a stator according to the first embodiment of the present invention. The stator in FIG. 1 includes a ring-like vibration plate 1 and a piezoelectric element plate 2 consisting of a piezoelectric ceramic material or the like and fixed to the vibration plate 1. The piezoelectric element plate 2 serves as an electro-mechanical energy conversion element. Electrodes $A_1$ and $A_2$ are arranged for a first group (to be referred to as an A phase) of piezoelectric elements, and electrodes $B_1$ and $B_2$ are arranged for a second group (to be referred to as a B phase) of piezoelectric elements An electrode $S_A$ is arranged for a piezoelectric element for detecting a vibration (to be referred to as an $S_A$-phase piezoelectric element hereinafter) of a standing wave generated upon application of an AC voltage to the A-phase electrodes (this standing wave is referred to as an A-phase standing wave hereinafter). Similarly, an electrode $S_B$ is arranged for a piezoelectric element for detecting a vibration (to be referred to as an $S_B$-phase piezoelectric element hereinafter) of a standing wave generated upon application of an AC voltage to the B-phase electrodes (this standing wave is referred to as a B-phase standing wave hereinafter). Electrodes $G_1$ and $G_2$ are short-circuited with the lower surface of the piezoelectric element plate, and therefore serve as ground electrodes. The piezoelectric element plate portions corresponding to the above electrodes are polarized in advance to constitute divided piezoelectric element groups. The A-phase electrodes $A_1$ and $A_2$ are arranged at pitches of ½ wavelength, and the polarization directions of the corresponding piezoelectric element areas are alternately opposite to each other. The A-phase piezoelectric element group is phase-shifted from the B-phase piezoelectric element group by 90°, i.e., a ¼ wavelength. The lengths of the $S_A$- and $S_B$-phase piezoelectric elements and the electrodes $S_A$ and $S_B$ are equal to each other, i.e., a ¼ wavelength. Identical AC voltages are applied to the A- and B-phase electrodes to simultaneously generate A- and B-phase standing waves, but these waves have a time-phase difference of 90°. As a result, a composite wave becomes a travelling vibration wave.

A central position a-a' of the electrode $A_1$ is an antinode of the A-phase standing wave and a node of the B-phase standing node. A central position b-b' (shifted by a 5/4 wavelength from the position a-a') of the electrode $B_1$ is an antinode of the B-phase standing wave and a node of the A-phase standing wave. A central position c-c' of the vibration detection electrode $S_A$ ($S_A$-phase electrode) is a position shifted from the position a-a' by a ½ wavelength A central position d-d' of the vibration detection electrode $S_B$ ($S_B$-phase electrode) is a position shifted from the position b-b' by a ½ wavelength. Therefore, the position c-c' is an antinode of the A-phase standing wave and the position d-d' is an antinode of the B-phase standing wave.

If the position a-a' is plotted as the origin of the circumferential coordinates x, a waveform $V_A$ of the A-phase standing wave and a waveform $V_B$ of the B-phase standing wave are given as follows:

$$V_A = V_A \cdot \cos\left(\frac{2\pi}{\lambda} x\right) \cdot \cos \omega t$$

$$V_B = V_B \cdot \cos\left(\frac{2\pi}{\lambda} x + \frac{\pi}{2}\right) \cdot \cos(\omega t + \theta)$$

where $\lambda$ is the wavelength, $\omega$ is an angular frequency, t is arbitrary time, and $\theta$ is a time-phase difference between both the standing waves. Therefore, the $$V_A + V_B =$$

$$\frac{V_A + V_B}{2} V(2\omega t) \cos\left[\frac{2\pi}{\lambda} x + \frac{\pi}{4} - \operatorname{Tan}^{-1}(\Phi(\omega t))\right] +$$

$$\frac{V_A - V_B}{2} V(2\omega t) \cos\left[\frac{2\pi}{\lambda} x + \frac{\pi}{4} - \operatorname{Tan}^{-1}\left(\frac{1}{\Phi(\omega t)}\right)\right]$$

for $$V(2\omega t) = \sqrt{1 + \cos\theta \cos(2\omega t + \theta)}$$

$$\Phi(\omega t) = \tan\left(\omega t + \frac{\theta}{2}\right)\tan\frac{\theta}{2}$$

Outputs $V_{SA}$ and $V_{SB}$ from the A- and B-phase electrodes $S_A$ and $S_B$ are given as follows:

$$V_{SA} = K V_A \cos \omega t$$

$$V_{SB} = K V_B \cos(\omega t + \theta)$$

where K is a proportional constant

The AC voltages are respectively applied to the A- and B-phase electrodes $S_A$ and $S_B$ to satisfy the following conditions:

$$|V_{SA}| = |V_{SB}|$$

$$\angle V_{SA} - \angle V_{SB} = \theta = \pi/2$$

therefore, the waveform of the travelling wave can be ideal as follows:

$$V_A + V_B = V_A \cos(2\pi x/\lambda - \omega t)$$

Figure 2:
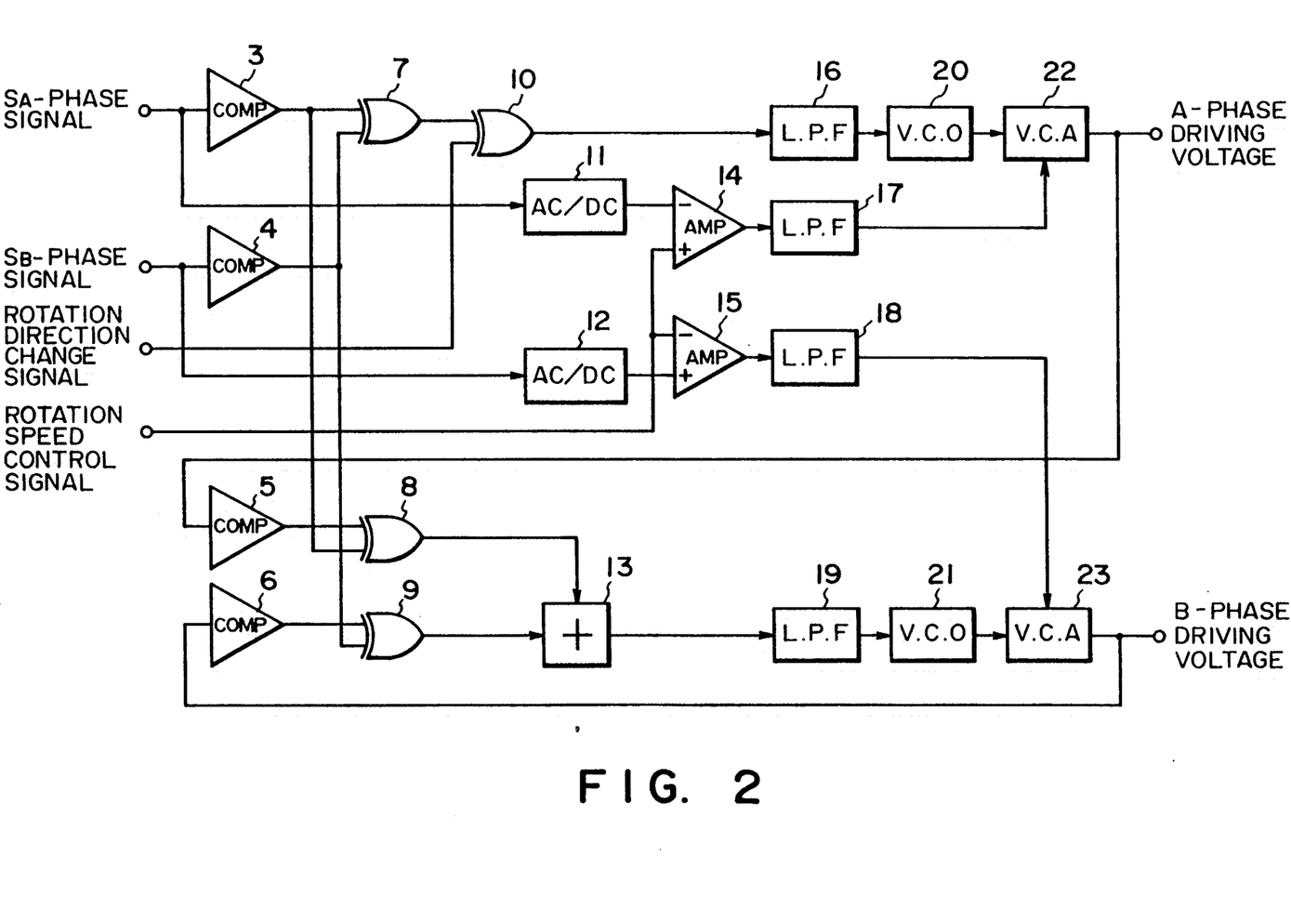
FIG. 2 is a block diagram of a driver circuit of the vibration wave motor.

A driver circuit for equalizing the amplitude of the $S_A$-phase detection voltage with that of the $S_B$-phase detection voltage and providing a time-phase difference of $\pi/2$ between the detection voltages is shown in FIG. 2.

Referring to FIG. 2, the driver circuit includes comparators 3, 4, 5, and 6, exclusive OR gates 7, 8, 9, and 10, known AC-DC converters (AC/DC) 11 and 12, a 2-input analog adder 13, amplifiers 14, 15, low-pass filters (LPFs) 16, 17, 18 and 19, voltage-controlled ocsillators (VCOs) 20 and 21, and voltage-controlled amplifiers (VCAs) 22 and 23.

The comparator 3 converts an $S_A$-phase signal from the vibration detection electrode $S_A$ into a logical level (voltages corresponding to binary values are $+V/2$ and $-V/2$). The comparator 4 converts an $S_B$-phase signal from the vibration detection electrode $S_B$ into a logic level. The comparator 5 converts an A-phase driving voltage applied to the A-phase electrode into a logic level, and the comparator 6 converts a B-phase driving voltage applied to the B-phase electrode into a logic level.

Figure 3:
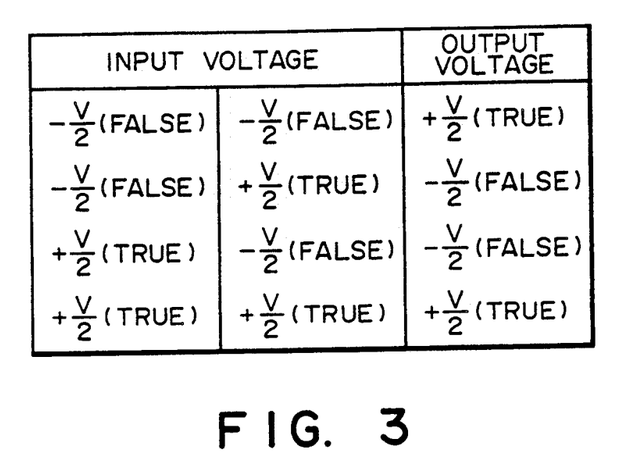
FIG. 3 is a truth table of exclusive OR gates.

A truth table of the exclusive OR gates 7, 8, 9, and 10 is shown in FIG. 3.

Figure 4:
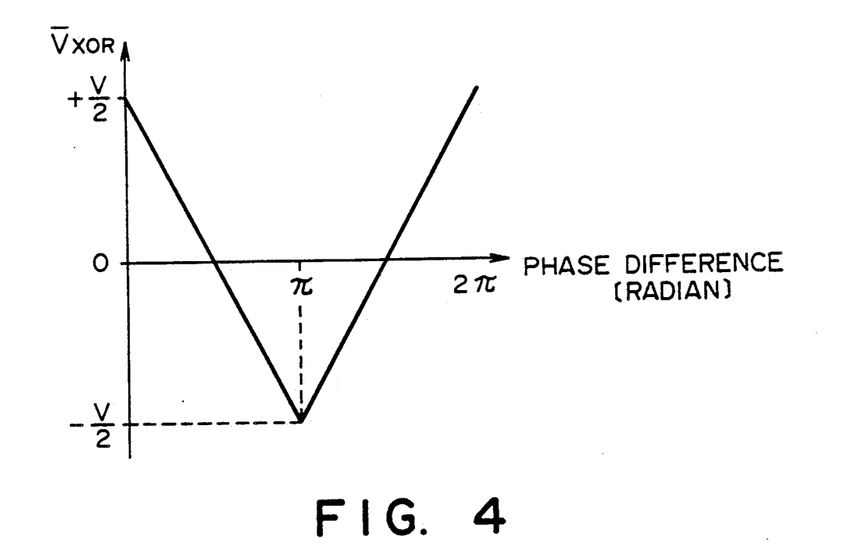
FIG. 4 is a graph showing phase difference detection characteristics by the exclusive OR gates.

Each of the exclusive OR gates 7, 8, and 9 detects a phase difference between two corresponding inputs. FIG. 4 shows an output corresponding to the detected phase differences. As shown in FIG. 4, an average value $\overline{V_{XOR}}$ of the outputs generated by the exclusive OR gates and representing the phase differences is changed linearly as a function of the phase difference.

Figure 5:
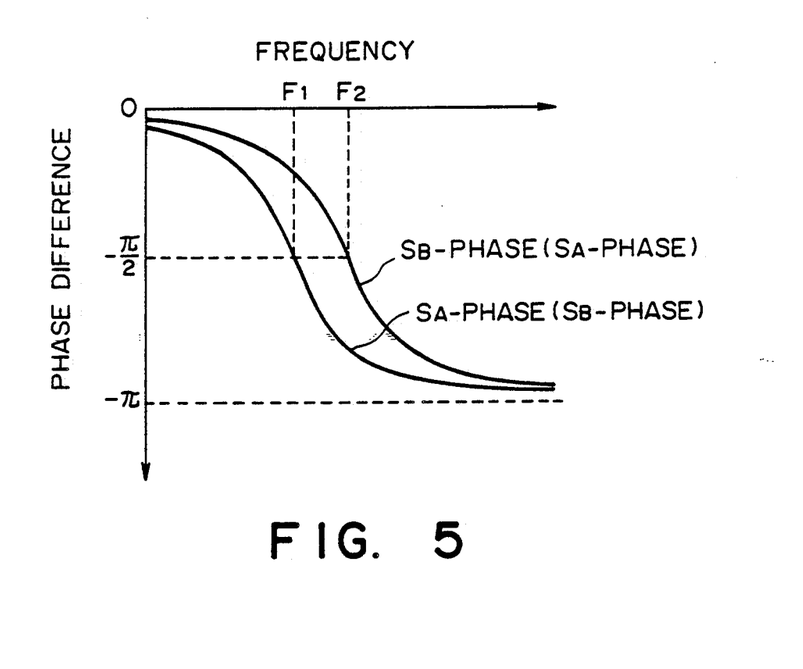
FIG. 5 is a graph showing frequency characteristics of a standing wave.

The exclusive OR gate 7 detects a phase difference between the $S_A$- and $S_B$-phase signals. The exclusive OR gate 8 detects a phase difference between the $S_A$-phase signal and the A-phase driving voltage. The exclusive OR gate 9 detects a phase difference between the $S_B$-phase signal and the B-phase driving voltage. The exclusive OR gate 10 switches inversion/noninversion of an output from the exclusive OR gate 7 in accordance with a rotational direction switching signal A signal of the phase difference between the $S_A$- and $S_B$- phase signals is input from the exclusive OR gate 7 to the voltage-controlled oscillator (VCO) 20 through the exclusive OR gate 10 and the low-pass filter (LPF) 16. The phase of the output signal from the voltage-controlled oscillator (VCO) 20 is controlled such that an average value of the outputs from the exclusive OR gate 7 becomes zero. In other words, the phase shift of the $S_A$-phase signal from the $S_B$-phase signal is controlled to be set as $+\pi/2$ or $-\pi/2$. Switching of the sign of the phase difference is performed by the rotational direction switching signal The phase difference between the A-phase driving voltage and the $S_A$-phase signal, which is detected by the exclusive OR gate 8, and the phase difference between the B-phase driving voltage and the $S_B$-phase signal, detected by the exclusive OR gate 9, are given as shown in FIG. 5.

Figure 6:
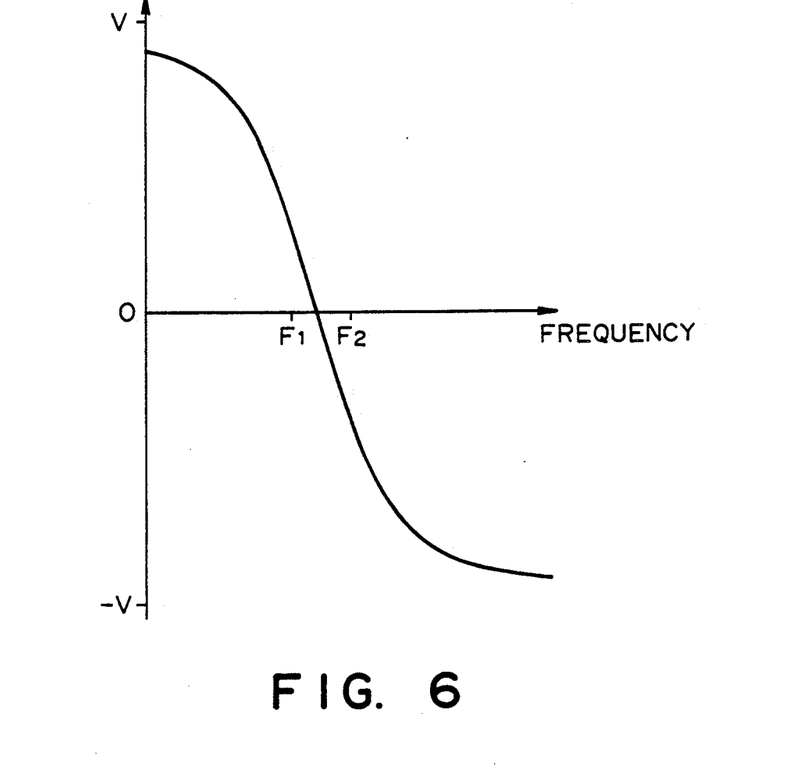
FIG. 6 is a graph showing an output from an analog adder shown in FIG. 2.

Since the phase differences detected by the exclusive OR gates 8 and 9 are detected with reference to $-\pi/2$, an output from the 2-input analog adder 13 is set to be zero between an A-phase (B-phase) resonance frequency $F_1$ and a B-phase (A-phase) resonance frequency $F_2$, as shown in FIG. 6.

A sum signal of the phase difference between the A-phase driving voltage and the $S_A$-phase signal and the phase difference between the B-phase driving voltage and the $S_B$-phase signal is supplied from the analog adder 13 to the voltage-controlled oscillator (VCO) 21 through the low-pass filter (LPF) 19. Therefore, the frequency is controlled such that the sum of the phase differences becomes zero. AC-DC converters (AC/DC) 11 and 12 convert the amplitudes (e.g., root-mean-square values, average values, or peak values) of the $S_a$- and $S_B$-phase signals into DC amplitude signals, respectively. The DC amplitude signals of the $S_A$- and $S_B$-phase signals are input to the amplifiers 14 and 15, respectively. Differences between the S-phase amplitude setting signal and the respective amplitude signals are amplified with high gains. The amplified signals are supplied to the voltage-controlled amplifiers (VCAs) 22 and 23 through the low-pass filters (LPFs) 17 and 18, respectively The gains of the voltage-controlled amplifiers (VCAs) 22 and 23 are controlled such that the amplitudes of the $S_A$- and $S_B$-phase signals are set to be amplitudes determined by the S-phase amplitude setting signals.

Figure 7:
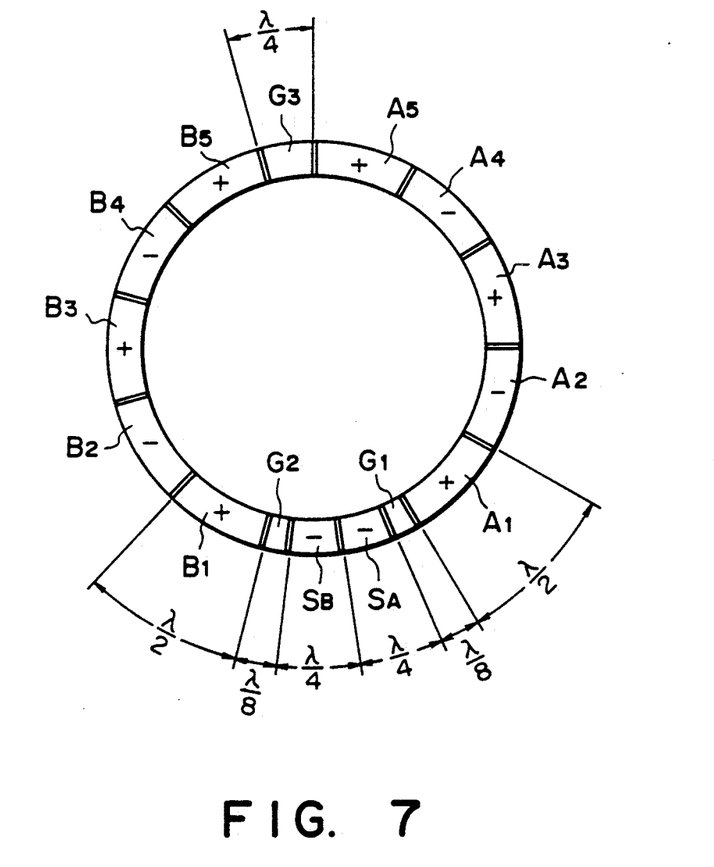
FIG. 7 is a plan view showing the electrode layout in the vibration wave motor shown in FIGS. 1A and 1B.

FIG. 7 shows the electrode layout according to the first embodiment of the present invention. Referring to FIG. 7, the electrode structure includes A-phase driving electrodes $A_1$, $A_2$, $A_3$, $A_4$, and $A_5$, B-phase driving electrodes $B_1$, $B_2$, $B_3$, $B_4$, and $B_5$, electrodes $G_1$, $G_2$, and $G_3$ which are rendered conductive with the lower surface, i.e., ground electrodes, an A-phase standing wave vibration detection electrode $S_A$, and B-phase standing wave vibration detection electrode $S_B$. The areas of the A-phase driving electrodes $A_1$ to $A_5$ and the B-phase driving electrodes $B_1$ to $B_5$ are as large as possible in view of vibration efficiency.

An operation of the first embodiment will be described in detail mainly with reference to FIG. 2. FIG. 2 shows a driver circuit consisting of control circuit blocks. The first block comprises the comparators 3 and 4, the exclusive OR gates 7 and 10, the low-pass filter (LPF) 16, and the voltage-controlled oscillator (VCO) 20. The first block controls the phase shift of the A-phase driving voltage from the B-phase driving voltage such that the phase shift of the $S_A$-phase signal from the $S_B$-phase signal is set to be $\pi/2$ or $-\pi/2$. The second block comprises the AC-DC converters (AC/DC) 11 and 12, the amplifiers 14, and 15, the low-pass filters (LPFs) 17 and 18, and the voltage-controlled amplifiers (VCAs) 22 and 23. The second block controls the amplitudes of the A- and B-phase driving voltages such that the amplitudes of the $S_A$- and $S_B$-phase signals are set to be the amplitudes designated by rotational speed control signals The third block comprises the comparators 3, 4, 5, and 6, the exclusive OR gates 8 and 9, the analog adder 13, the low-pass filter (LPF) 19, and the voltage-controlled oscillator (VCO) 21. The third block controls the frequency of the B-phase driving voltage such that the frequency of the B-phase driving voltage is set to be an intermediate frequency between the A- and B-phase resonance frequencies. The three blocks will be sequentially described below from the first block.

The first block will be described below.

Figure 10:
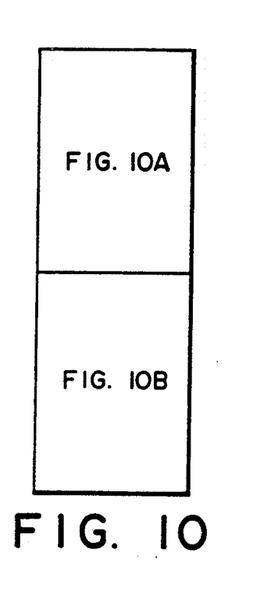
Figure 10A:
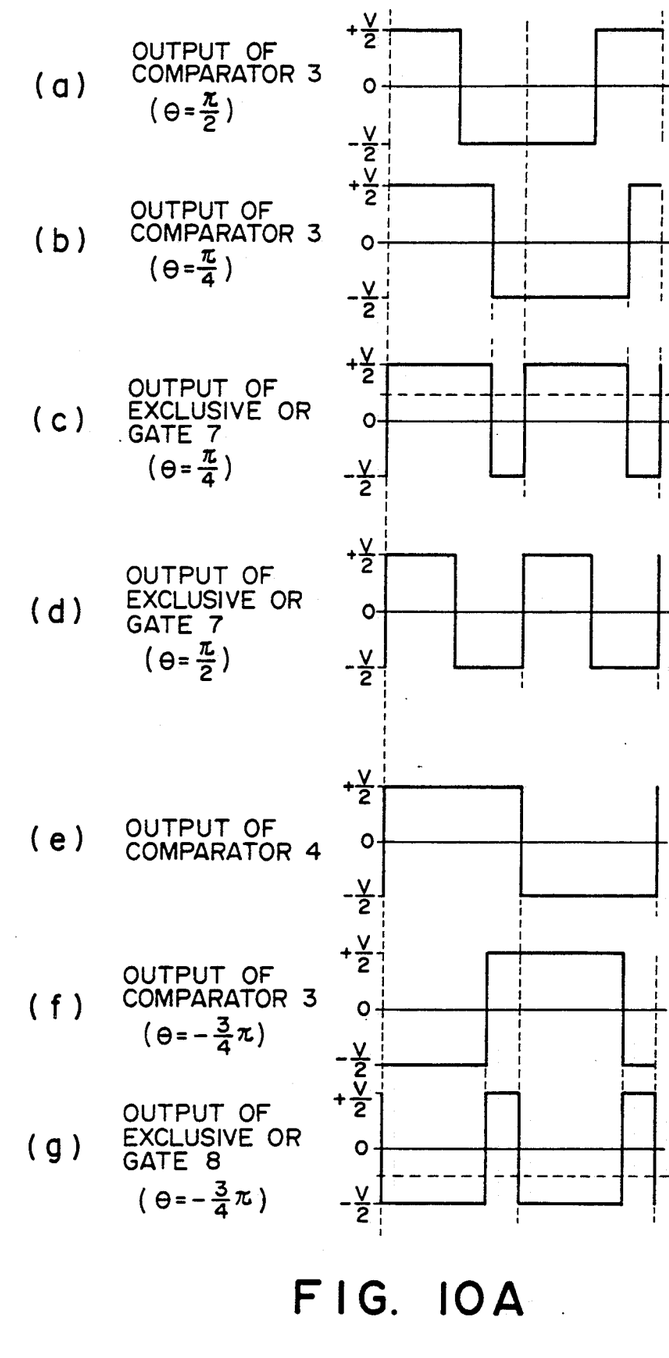
Figure 10B:
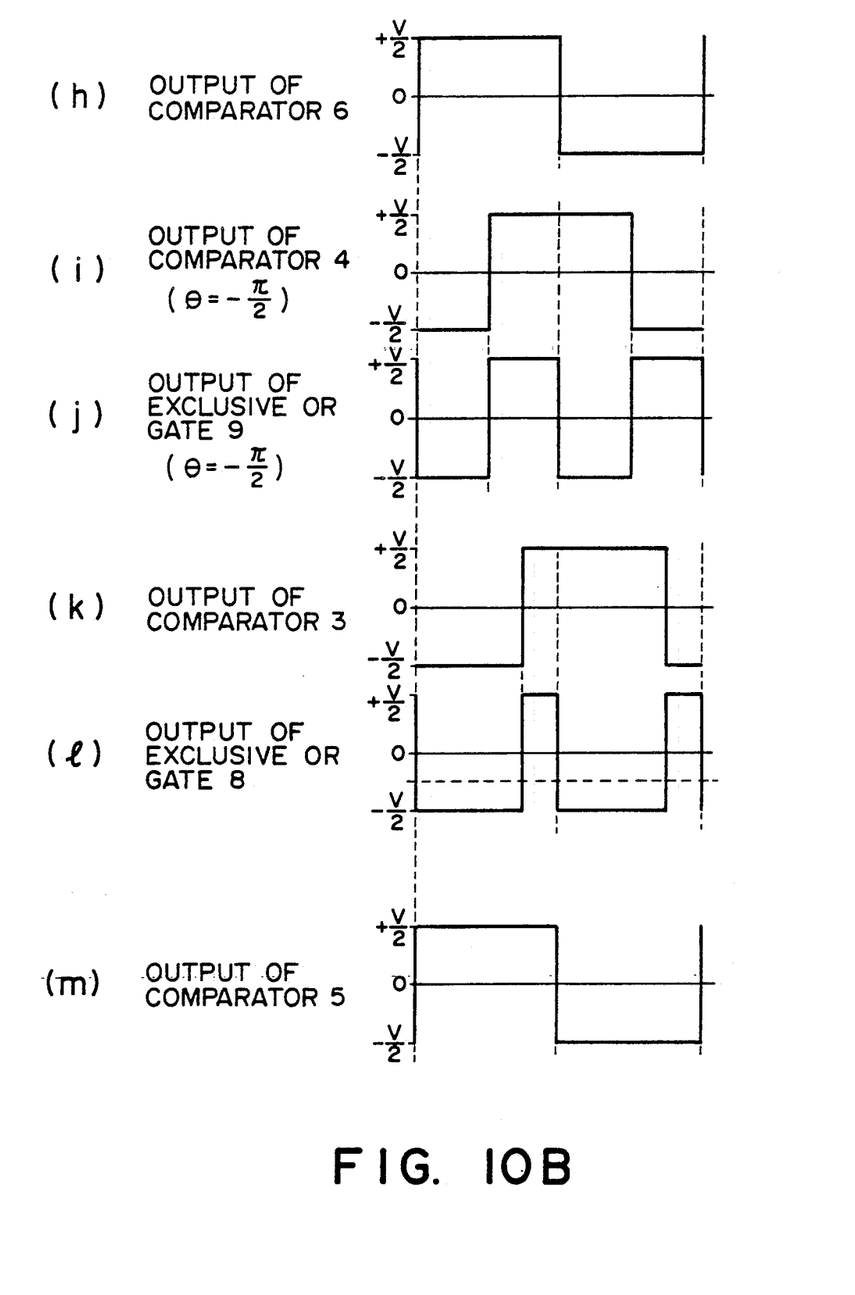

When the phase shift of the $S_A$-phase signal from the $S_B$-phase signal (see FIG. 2) is changed from the ideal state ($\pi/2$) to a state delayed by $\pi/4$ ($+\pi/4$), as shown in FIG. 10(b), an average value of the outputs from the exclusive OR gate 7 becomes larger than zero, as shown in FIG. 10(c). When the output from the gate 7 becomes positive in this manner, an average value of the outputs from the exclusive OR gate 10 becomes positive because the rotational direction switching signal as one input of the exclusive OR gate 10 is set to be V/2. The signal from the exclusive OR gate 10 is input to the voltage-controlled oscillator (VCO) 20 through the low-pass filter (LPF) 16. An output as an A-phase driving voltage from the oscillator 20 is applied to the A-phase driving electrodes $A_1$ to $A_5$ through the voltage-controlled amplifier 22. Therefore, the phase of the $S_A$-phase signal is advanced, and the average value (see FIG. 10(c)) of the outputs from the exclusive OR gate 7 is decreased toward zero. When this average value becomes zero (FIG. 10(d)), one input to the exclusive OR gate 10 becomes a signal shown in FIG. 10(d). Therefore, the phase difference between the $S_A$-phase signal (FIG. 10(a)) and the $S_B$-phase signal (FIG. 10(c)) reaches $\pi/2$, thus restoring the ideal state.

An operation will be described in which the rotational direction is reversed and the rotational direction switching signal represents $-V/2$.

Assume that the phase of the $S_A$-phase signal delayed from the $S_B$-phase signal by $\pi/4$ and is thus changed from the ideal phase of $-\pi/2$ to $-3\pi/4$ (FIG. 10(*f*)). In this case, an average value of the outputs from the exclusive OR gate 7 becomes negative (FIG. 10(*g*)). When the output from the exclusive OR gate 7 is input to the exclusive OR gate 10, an output from the exclusive OR gate 10 becomes the one shown in FIG. 10(*c*) because one input signal of the exclusive OR gate 10 represents $-V/2$. Therefore, the phase of the $S_A$-phase signal is advanced in the same manner as described above, and finally reaches $-\pi/2$.

The operation of the second block will be described in detail below In this case, the frequencies of the output signals from the voltage-controlled oscillators 20 and 21 have been set to be appropriate values.

The second block comprises two subblocks. The first subblock comprises the AC-DC converter 11, the amplifier 14, the low-pass filter 17, and the voltage-controlled amplifier 22 and controls the amplitude of the $S_A$-phase signal. The second subblock comprises the AC-DC converter 12, the amplifier 15, the low-pass filter 18, and the voltage-controlled amplifier 23 and controls the amplitude of the $S_B$-phase signal. The subblock for the $S_A$-phase signal is operated in the same manner as in the subblock for the $S_B$-phase signal. Only the subblock for the $S_A$-phase signal will be described, and a description of the other subblock will be omitted. Gains of the voltage-controlled amplifiers 22 and 23 for controlling the gain-controlled voltage of $-V_A$ to $+V_A$ ($V_A$ is a value representing the range of output voltages from the low-pass filters 17 and 18) fall within the range between 0 and Amax.

The $S_A$-phase signal is converted into a DC voltage corresponding to the amplitude of the $S_A$-phase signal by the AC-DC converter 11. This DC voltage is input to the negative input terminal ($-$) of the amplifier 14. A difference between the amplitude of the rotational speed control signal and the amplitude of the $S_A$-phase signal is amplified by the amplifier 14. The amplified difference is smoothed and integrated by the low-pass filter 17. The integrated signal is input to the gain control input terminal of the voltage-controlled amplifier 22. Therefore, the gain of the voltage-controlled amplifier 22 is changed to control the amplitude of the A-phase driving voltage. If the amplitude of the $S_A$-phase signal is smaller than the amplitude designated by the rotational speed control signal, an output voltage of the amplifier 14 is higher than zero, and an output voltage of the low-pass filter 17 is increased. The gain of the voltage-controlled amplifier 22 is increased, the amplitude of the A-phase driving voltage is increased, and the amplitude of the $S_A$-phase signal can be controlled to the amplitude designated by the rotational speed control signal.

The $S_B$-phase signal can also be controlled to have the amplitude designated by the rotational speed control signal. Therefore, relation $|V_{SA}| = |V_{SB}|$ can be established.

An operation of the third block will be described under the condition that the first and second blocks are normally operated A subblock consisting of the comparator 3 and 5 and the exclusive OR gate 8 and a subblock consisting of comparators 4 and 6 and the exclusive OR gate 9 are the same circuit arrangement as that of the phase difference detector (3, 4, and 7) of the first block. A frequency of an output signal in response to an input voltage range of $-V_C$ to $+V_C$ (where $V_C$ is a value showing the range of the output voltage of the low-pass filter (LPF) 19) of the voltage-controlled oscillator 21 falls within the range of Fmin to Fmax and Fmin $< F_1 < F_2 <$ Fmax (where $F_1$ and $F_2$ are A- and B-phase resonance frequencies). The relationship between the phase difference and the frequency of the A-phase driving voltage and $S_A$-phase signal is given in FIG. 5. FIG. 6 shows the relationship between the frequencies of the A- and B-phase driving voltages and the average value of the outputs from the analog adder 13 when the relationship between the frequency and the phase difference shown in FIG. 5 is established. If the frequency of the driving voltage is given as $F_2$, inputs to the exclusive OR gate 8 are given, as shown in FIGS. 10(*k*) and 10(*m*), respectively. Inputs to the exclusive OR gate 9 are given, as shown in FIGS. 10(*h*) and 10(*i*), respectively Outputs from the exclusive OR gates 8 and 9 are shown in FIGS. 10(*l*) and 10(*j*), respectively. An average value of the outputs from the analog adder 13 is smaller than zero. A voltage smoothed and integrated through the low-pass filter 19 is decreased, and the frequency of the output voltage from the voltage-controlled oscillator 21 is decreased. When the frequency of the voltage-controlled oscillator 21 is decreased, the average value of the outputs from the exclusive OR gates 8 and 9 increase and the average value of the output from the analog adder 13 finally reaches zero. Therefore, the frequency of the driving voltage is controlled to be an intermediate frequency between $F_1$ and $F_2$.

Figure 8:
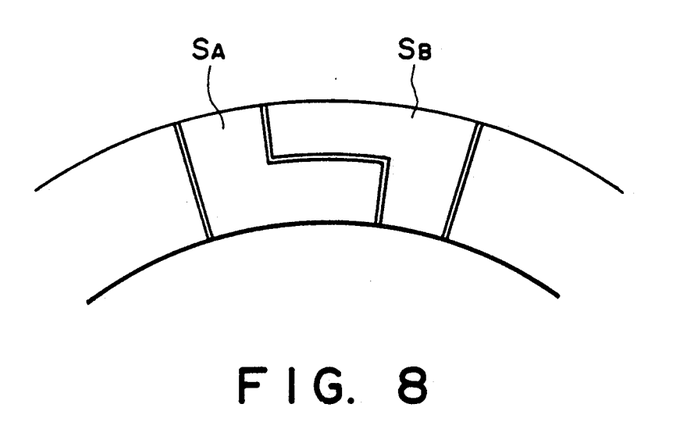
FIG. 8 is an enlarged plan view of a vibration detection electrode portion according to the second embodiment of the present invention.
Figure 9:
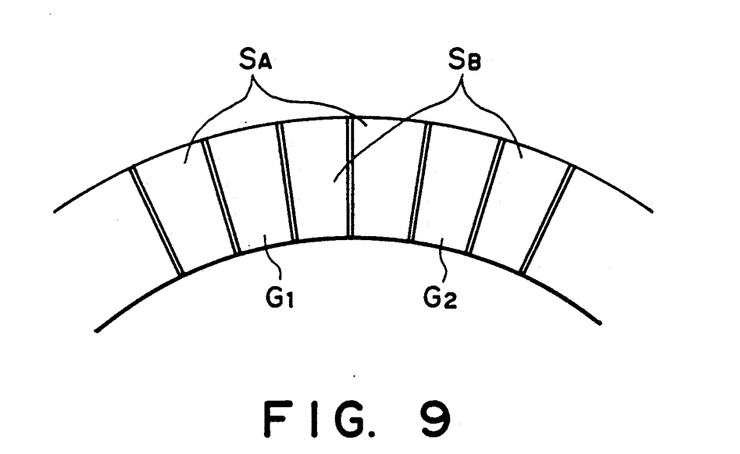
FIG. 9 is an enlarged plan view showing a vibration detection electrode portion according to the third embodiment of the present invention.

Referring to FIG. 7, the vibration detection electrodes $S_A$ and $S_B$ are arranged at two antinode positions of the A- and B-phase standing waves. In other words, the vibration detection electrode is arranged between the ground electrodes $G_1$ and $G_2$. However, if an vibration detection electrode is arranged to be centered on the corresponding antinode of the standing wave, any of the phase electrodes $A_1$ and $B_1$ to the phase electrodes $A_5$ and $B_5$ may be used in place of the vibration detection electrodes $S_A$ and $S_B$. Alternatively, even if the vibration detection electrodes $S_A$ and $S_B$ are not accurately centered on the antinodes of the corresponding standing waves but substantially centered on the antinode positions, that is, if an output having the same phase as that of one standing wave can be obtained and is not adversely affected by the other standing wave, an electrode shape shown in FIG. 8, a split electrode arrangement for obtaining a composite output, as shown in FIG. 9 may be employed.

According to the present invention, the vibration detection electro-mechanical energy convertion element areas are located to be centered on substantially the antinodes of the standing waves of the electrode groups. Therefore, the standing waves can be detected in a real time manner. In addition, the conversion elements can be driven at desired phases and an amplitude. Therefore, the amplitudes of the standing waves of both the groups can be made equal to each other, and the time-phase of each standing wave can be set to be $\pi/2$, thereby generating an ideal travelling wave and improving driving efficiency and rotational stability of the motor.

What is claimed is:

1. A vibration wave motor comprising:

(a) first and second electro-mechanical energy conversion elements for generating first and second standing waves when electrical signals are applied to said first and second electro-mechanical energy conversion elements, respectively;

(b) a vibration member on which said first and second electro-mechanical conversion elements are fixed, said vibration member being arranged to generate a travelling wave when the first and second standing waves are generated on said first and second electro-mechanical energy conversion elements;

(c) means frictionally driven by the travelling wave; and (d) first and second vibration detecting means formed on said vibration member to control output characteristics of said motor, said first detecting means being arranged at a position substantially at an antinode of the first standing wave, and said second detecting means being arranged at a position substantially at an antinode of the second standing wave.

2. A motor according to claim 1, wherein said first and second electro-mechanical energy conversion elements are ring-like elements, respectively.

3. A vibration wave motor comprising:

(a) first and second electro-mechanical energy conversion elements for generating first and second standing waves when electrical signals are applied to said first and second electro-mechanical energy conversion elements, respectively;

(b) a vibration member on which said first and second electro-mechanical conversion elements are fixed, said vibration member being arranged to generate a travelling wave when the first and second standing waves are generated on said first and second electro-mechanical energy conversion elements; and (c) first and second vibration detecting means formed on said vibration member to control output characteristics of said motor, said first detecting means being arranged at a position substantially at an antinode of the first standing wave, and said second detecting means being arranged at a position substantially at an antinode of the second standing wave.

4. A motor according to claim 3, wherein said first and second electro-mechanical energy conversion elements are ring-like elements, respectively.

5. A vibration wave actuator comprising:

(a) first and second electro-mechanical energy conversion elements for generating first and second standing waves when electrical signals are applied to said first and second electro-mechanical energy conversion elements, respectively;

(b) a vibration member on which said first and second electro-mechanical conversion elements are fixed, said vibration member being arranged to generate a travelling wave when the first and second standing waves are generated on said first and second electro-mechanical energy conversion elements; and (c) first and second vibration detecting means formed on said vibration member to control output characteristics of said actuator, said first detecting means being arranged at a position substantially at an antinode of the first standing wave, and said second detecting means being arranged at a position substantially at an antinode of the second standing wave.

6. A vibration wave actuator comprising:

(a) first and second electro-mechanical energy conversion elements for generating first and second standing waves when electrical signals are applied to said first and second electro-mechanical energy conversion elements, respectively;

(b) a vibration member on which said first and second electro-mechanical conversion elements are fixed, said vibration member being arranged to generate a travelling wave when the first and second standing waves are generated on said first and second electro-mechanical energy conversion elements;

(c) first and second vibration detecting means arranged on said vibration member, said first detecting means being arranged at a position substantially at an antinode of the first standing wave, and said second detecting means being arranged at a position substantially at an antinode of the second standing wave; and (d) means for controlling the electrical signals on the basis of outputs from said first and second vibration detecting means, said control means including circuitry for adjusting a phase difference between a first signal from said first vibration detecting means and a second signal from said second vibration detecting means to be $\pi/2$ and for adjusting amplitudes of the first and second signals so as to be equal to each other.

7. A vibration wave motor comprising:

(a) first and second electro-mechanical energy conversion elements for generating first and second standing waves when electrical signals are applied to said first and second electro-mechanical energy conversion elements, respectively;

(b) a vibration member on which said first and second electro-mechanical conversion elements are fixed, said vibration member being arranged to generate a travelling wave when the first and second standing waves are generated on said first and second electro-mechanical energy conversion elements;

(c) first and second vibration detecting means arranged on said vibration member, said first detecting means being arranged at a position substantially at an antinode of the first standing wave, and said second detecting means being arranged at a position substantially at an antinode of the second standing wave; and (d) means for controlling the electrical signals on the basis of outputs from said first and second vibration detecting means.

8. A vibration wave actuator comprising:

(a) first and second electro-mechanical energy conversion elements for generating first and second standing waves when electrical signals are applied to said first and second electro-mechanical energy conversion elements, respectively;

(b) a vibration member on which said first and second electro-mechanical conversion elements are fixed, said vibration member being arranged to generate a travelling wave when the first and second standing waves are generated on said first and second electro-mechanical energy conversion elements; and (c) first and second vibration detecting means formed on said vibration member for controlling output characteristics of said actuator, said first vibration detecting means detecting the first standing wave generated by said first electro-mechanical energy conversion element, and said second vibration detecting means detecting the second standing wave generated by said second electro-mechanical energy conversion element.

9. A vibration wave actuator comprising:
(a) first and second electro-mechanical energy conversion elements for generating first and second standing waves when electrical signals are applied to said first and second electro-mechanical energy conversion elements, respectively;
(b) a vibration member on which said first and second electro-mechanical conversion elements are fixed, said vibration member being arranged to generate a travelling wave when the first and second standing waves are generated on said first and second electro-mechanical energy conversion elements; and
(c) first vibration detecting means which is arranged to generate an output signal which primarily represents the first standing wave and which is not adversely affected by the second standing wave;
(d) second vibration detecting means which is arranged to generate an output signal which primarily represents the second standing wave and which is not adversely affected by the first standing wave;
(e) means for controlling the output characteristics of said actuator on the basis of output signals from said first and second vibration detecting means.

* * * * *

UNITED STATES PATENT AND TRADEMARK OFFICE
CERTIFICATE OF CORRECTION

PATENT NO. : 5,001,404
DATED : March 19, 1991
INVENTOR(S) : KENICHI KATAOKA

It is certified that error appears in the above-identified patent and that said Letters Patent is hereby corrected as shown below:

COLUMN 4

Line 2, "$V_A$" should read --$\dot{V}_A$--.

Line 3, "$V_B$" should read --$\dot{V}_B$--.

Line 7, "$V_A$" (first occurrence) should read --$\dot{V}_A$--.

Line 11, "$V_B$" (first occurrence) should read --$\dot{V}_B$--.

Line 17, "$V_A + V_B$" should read --$\dot{V}_A + \dot{V}_B$--.

Line 34, "$V_{SA}$ and $V_{SB}$" should read --$\dot{V}_{SA}$ and $\dot{V}_{SB}$--.

Line 37, "$V_{SA}$" should read --$\dot{V}_{SA}$--.

Line 38, "$V_{SB}$" should read --$\dot{V}_{SB}$--.

Line 45, "$|V_{SA}| = |V_{SB}|$" should read --$|\dot{V}_{SA}| = |\dot{V}_{SB}|$--.

Line 47, "$V_{SA}$" should read --$\dot{V}_{SA}$-- and
"$V_{SB}$" should read --$\dot{V}_{SB}$--.

Line 51, "$V_A + V_B$" should read --$\dot{V}_A + \dot{V}_B$--.

COLUMN 7

Line 61, "$|V_{SA}| = |V_{SB}|$" should read --$|\dot{V}_{SA}| = |\dot{V}_{SB}|$--.

COLUMN 8

Line 39, "an" should read --any--.

UNITED STATES PATENT AND TRADEMARK OFFICE
CERTIFICATE OF CORRECTION

PATENT NO. : 5,001,404

DATED : March 19, 1991

INVENTOR(S) : KENICHI KATAOKA

It is certified that error appears in the above-identified patent and that said Letters Patent is hereby corrected as shown below:

COLUMN 12

Line 2, "and" should be deleted.

Line 10, "wave;" should read --wave; and--.

Signed and Sealed this

Sixth Day of October, 1992

Attest:

DOUGLAS B. COMER

*Attesting Officer*  Acting Commissioner of Patents and Trademarks